(12) United States Patent
Plagge et al.

(10) Patent No.: US 9,811,314 B2
(45) Date of Patent: Nov. 7, 2017

(54) METADATA EXCHANGE INVOLVING A NETWORKED PLAYBACK SYSTEM AND A NETWORKED MICROPHONE SYSTEM

(71) Applicant: Sonos, Inc, Santa Barbara, CA (US)

(72) Inventors: Mark Plagge, Santa Barbara, CA (US); Simon Jarvis, Cambridge, MA (US); Christopher Butts, Evanston, IL (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/131,244

(22) Filed: Apr. 18, 2016

(65) Prior Publication Data

US 2017/0242656 A1   Aug. 24, 2017

Related U.S. Application Data

(60) Provisional application No. 62/298,418, filed on Feb. 22, 2016, provisional application No. 62/298,433, (Continued)

(51) Int. Cl.
*H04R 3/00* (2006.01)
*G06F 3/16* (2006.01)
*H04L 29/08* (2006.01)

(52) U.S. Cl.
CPC .............. *G06F 3/167* (2013.01); *H04L 67/10* (2013.01); *H04L 67/2804* (2013.01)

(58) Field of Classification Search
CPC ........ H04R 2227/003; H04R 2227/005; H04R 27/00; H04R 29/001; H04R 29/004; H04R 29/007; H04R 29/008; G10L 21/00; H04L 65/60; H04L 65/608; H04L 67/025; H04M 1/6083; H04M 1/72558; H04S 7/303; H04W 12/02; H04W 4/22; H04W 76/007;
(Continued)

(56) References Cited

U.S. PATENT DOCUMENTS 4,941,187 A   7/1990   Slater
5,440,644 A   8/1995   Farinelli et al.
(Continued)

FOREIGN PATENT DOCUMENTS

AU   2017100581 A4   6/2017
EP   1349146 A1   10/2003
(Continued)

OTHER PUBLICATIONS

US 9,299,346, 03/2016, Hart et al. (withdrawn)
(Continued)

*Primary Examiner* — Lun-See Lao
(74) *Attorney, Agent, or Firm* — McDonnell Boehnen Hulbert & Berghoff LLP

(57) ABSTRACT

Disclosed herein are systems and methods for establishing a metadata exchange channel between a media playback system and a networked microphone system, wherein the networked microphone system comprises a networked microphone device and a networked microphone server. After establishing the metadata exchange channel, the media playback system experiences a metadata exchange triggering event. In response to experiencing the metadata exchange triggering event, the media playback system provides metadata to the networked microphone system via the metadata exchange channel.

20 Claims, 6 Drawing Sheets

Related U.S. Application Data filed on Feb. 22, 2016, provisional application No. 62/298,439, filed on Feb. 22, 2016, provisional application No. 62/298,425, filed on Feb. 22, 2016, provisional application No. 62/298,350, filed on Feb. 22, 2016, provisional application No. 62/298,388, filed on Feb. 22, 2016, provisional application No. 62/298,393, filed on Feb. 22, 2016, provisional application No. 62/312,350, filed on Mar. 23, 2016.

(58) Field of Classification Search
CPC ... H04W 76/02; H04W 4/005; H04W 76/025; H04W 84/18; H04W 8/005
USPC ... 381/92, 56–59, 314, 300, 303, 61, 77, 96; 700/94; 715/736, 716; 370/338; 455/414.3; 379/202.01
See application file for complete search history.

(56) References Cited

U.S. PATENT DOCUMENTS

| | | | |
|---|---|---|---|
| 5,761,320 A | 6/1998 | Farinelli et al. | |
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,073,125 B2 * | 12/2011 | Zhang | H04M 3/56 379/202.01 |
| 8,103,009 B2 | 1/2012 | McCarty et al. | |
| 8,234,395 B2 | 7/2012 | Millington et al. | |
| 8,255,224 B2 | 8/2012 | Singleton et al. | |
| 8,364,481 B2 | 1/2013 | Strope et al. | |
| 8,423,893 B2 | 4/2013 | Ramsay et al. | |
| 8,483,853 B1 | 7/2013 | Lambourne | |
| 8,484,025 B1 | 7/2013 | Moreno et al. | |
| 8,831,957 B2 | 9/2014 | Taubman et al. | |
| 8,938,394 B1 | 1/2015 | Faaborg et al. | |
| 8,983,844 B1 | 3/2015 | Thomas et al. | |
| 9,215,545 B2 | 12/2015 | Dublin et al. | |
| 9,251,793 B2 | 2/2016 | LeBeau | |
| 9,288,597 B2 | 3/2016 | Carlsson et al. | |
| 9,300,266 B2 | 3/2016 | Grokop | |
| 9,318,107 B1 | 4/2016 | Sharifi | |
| 9,319,816 B1 | 4/2016 | Narayanan | |
| 9,412,392 B2 | 8/2016 | Lindahl | |
| 9,431,021 B1 * | 8/2016 | Scalise | G10L 21/00 |
| 9,443,527 B1 | 9/2016 | Watanabe et al. | |
| 9,472,201 B1 | 10/2016 | Sleator | |
| 9,472,203 B1 | 10/2016 | Ayrapetian et al. | |
| 9,489,948 B1 | 11/2016 | Chu et al. | |
| 9,494,683 B1 | 11/2016 | Sadek | |
| 9,509,269 B1 | 11/2016 | Rosenberg | |
| 9,514,752 B2 | 12/2016 | Sharifi | |
| 9,536,541 B2 | 1/2017 | Chen et al. | |
| 9,552,816 B2 | 1/2017 | Vanlund et al. | |
| 9,560,441 B1 | 1/2017 | McDonough, Jr. et al. | |
| 9,601,116 B2 | 3/2017 | Casado et al. | |
| 9,615,170 B2 | 4/2017 | Kirsch et al. | |
| 9,615,171 B1 | 4/2017 | O'Neill et al. | |
| 9,633,186 B2 | 4/2017 | Ingrassia, Jr. | |
| 9,633,660 B2 | 4/2017 | Haughay | |
| 9,704,478 B1 | 7/2017 | Vitaladevuni et al. | |
| 9,721,568 B1 | 8/2017 | Polansky et al. | |
| 9,721,570 B1 | 8/2017 | Beal et al. | |
| 9,728,188 B1 | 8/2017 | Rosen et al. | |
| 9,734,822 B1 | 8/2017 | Sundaram et al. | |
| 9,747,899 B2 | 8/2017 | Pogue et al. | |
| 9,747,920 B2 | 8/2017 | Ayrapetian et al. | |
| 9,747,926 B2 | 8/2017 | Sharifi et al. | |
| 9,754,605 B1 | 9/2017 | Chhetri | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0034280 A1 | 3/2002 | Infosino | |
| 2002/0072816 A1 | 6/2002 | Shdema et al. | |
| 2002/0124097 A1 | 9/2002 | Isely et al. | |
| 2003/0157951 A1 | 8/2003 | Hasty | |
| 2004/0024478 A1 | 2/2004 | Hans et al. | |
| 2006/0147058 A1 | 7/2006 | Wang | |
| 2007/0018844 A1 | 1/2007 | Sutardja | |
| 2007/0142944 A1 | 6/2007 | Goldberg et al. | |
| 2009/0005893 A1 | 1/2009 | Sugii et al. | |
| 2010/0023638 A1 | 1/2010 | Bowman | |
| 2010/0179874 A1 * | 7/2010 | Higgins | G06K 9/00664 705/14.53 |
| 2011/0280422 A1 | 11/2011 | Neumeyer et al. | |
| 2012/0297284 A1 | 11/2012 | Matthews, III et al. | |
| 2013/0183944 A1 | 7/2013 | Mozer et al. | |
| 2013/0317635 A1 | 11/2013 | Bates et al. | |
| 2013/0329896 A1 | 12/2013 | Krishnaswamy et al. | |
| 2013/0343567 A1 * | 12/2013 | Triplett | H04N 21/41407 381/77 |
| 2014/0006026 A1 | 1/2014 | Lamb et al. | |
| 2014/0075306 A1 | 3/2014 | Rega | |
| 2014/0094151 A1 | 4/2014 | Klappert et al. | |
| 2014/0100854 A1 * | 4/2014 | Chen | H04L 12/282 704/275 |
| 2014/0167931 A1 | 6/2014 | Lee et al. | |
| 2014/0363022 A1 | 12/2014 | Dizon et al. | |
| 2015/0154976 A1 | 6/2015 | Mutagi | |
| 2015/0280676 A1 | 10/2015 | Holman et al. | |
| 2015/0302856 A1 | 10/2015 | Kim et al. | |
| 2015/0341406 A1 | 11/2015 | Rockefeller et al. | |
| 2015/0363061 A1 | 12/2015 | De Nigris, III et al. | |
| 2015/0363401 A1 | 12/2015 | Chen et al. | |
| 2016/0007116 A1 | 1/2016 | Holman | |
| 2016/0021458 A1 | 1/2016 | Johnson et al. | |
| 2016/0029142 A1 | 1/2016 | Isaac | |
| 2016/0036962 A1 | 2/2016 | Rand et al. | |
| 2016/0042748 A1 | 2/2016 | Jain et al. | |
| 2016/0057522 A1 | 2/2016 | Choisel et al. | |
| 2016/0098393 A1 | 4/2016 | Hebert | |
| 2016/0173578 A1 | 6/2016 | Sharma et al. | |
| 2016/0239255 A1 | 8/2016 | Chavez et al. | |
| 2016/0314782 A1 | 10/2016 | Klimanis | |
| 2017/0076720 A1 | 3/2017 | Gopalan et al. | |
| 2017/0092297 A1 | 3/2017 | Sainath et al. | |
| 2017/0236512 A1 | 8/2017 | Williams et al. | |

FOREIGN PATENT DOCUMENTS

| | | | |
|---|---|---|---|
| EP | 1389853 A1 | 2/2004 | |
| EP | 2351021 B1 | 9/2017 | |
| JP | 2001236093 A | 8/2001 | |
| JP | 2004347943 A | 12/2004 | |
| JP | 2004354721 A | 12/2004 | |
| JP | 2005284492 A | 10/2005 | |
| JP | 2010141748 A | 6/2010 | |
| JP | 2013037148 A | 2/2013 | |
| JP | 2014071138 A | 4/2014 | |
| JP | 2014137590 A | 7/2014 | |
| WO | 0153994 | 7/2001 | |
| WO | 03093950 A2 | 11/2003 | |

(56) References Cited

FOREIGN PATENT DOCUMENTS

| WO | 2015037396 A1 | 3/2015 |
|---|---|---|
| WO | 2015178950 | 11/2015 |
| WO | 2017039632 A1 | 3/2017 |

OTHER PUBLICATIONS

Non-Final Office Action dated Dec. 12, 2016, issued in connection with U.S. Appl. No. 15/098,718, filed Apr. 14, 2016, 11 pages.
Non-Final Office Action dated Jan. 13, 2017, issued in connection with U.S. Appl. No. 15/098,805, filed Apr. 14, 2016, 11 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
"Denon 2003-2004 Product Catalog," Denon, 2003-2004, 44 pages.
Corrected Notice of Allowability dated Mar. 8, 2017, issued in connection with U.S. Appl. No. 15/229,855, filed Aug. 5, 2016, 6 pages.
International Searching Authority, International Search Report and Written Opinion dated May 23, 2017, issued in connection with International Application No. PCT/US2017/018739, filed Feb. 21, 2017, 10 pages.
International Searching Authority, International Search Report and Written Opinion dated May 30, 2017, issued in connection with International Application No. PCT/US2017/018728, filed Feb. 21, 2017, 11 pages.
Non-Final Office Action dated Jun. 1, 2017, issued in connection with U.S. Appl. No. 15/223,218, filed Jul. 29, 2016, 7 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Apr. 19, 2017, issued in connection with U.S. Appl. No. 15/131,776, filed Apr. 18, 2016, 12 pages.
Non-Final Office Action dated Jan. 26, 2017, issued in connection with U.S. Appl. No. 15/098,867, filed Apr. 14, 2016, 16 pages.
Notice of Allowance dated Feb. 14, 2017, issued in connection with U.S. Appl. No. 15/229,855, filed Aug. 5, 2016, 11 pages.

\* cited by examiner

METADATA EXCHANGE INVOLVING A NETWORKED PLAYBACK SYSTEM AND A NETWORKED MICROPHONE SYSTEM

CROSS-REFERENCE TO RELATED APPLICATIONS

The present application claims priority to (i) U.S. Provisional App. 62/298,418, filed Feb. 22, 2016, titled "Audio Response Playback," and which is currently pending; (ii) U.S. Provisional App. 62/298,433, filed Feb. 22, 2016, titled "Room-corrected Voice Detection," and which is currently pending; (iii) U.S. Provisional App. 62/298,439, filed Feb. 22, 2016, titled "Content Mixing," and which is currently pending; (iv) U.S. Provisional App. 62/298,425, filed Feb. 22, 2016, titled "Music Service Selection," and which is currently pending; (v) U.S. Provisional App. 62/298,350, filed Feb. 22, 2016, titled "Metadata exchange involving a networked playback system and a networked microphone system," and which is currently pending; (vi) U.S. Provisional App. 62/298,388, filed Feb. 22, 2016, titled "Handling of loss of pairing between networked devices," and which is currently pending; (vii) U.S. Provisional App. 62/298,393, filed Feb. 22, 2016, titled "Action based on User ID," and which is currently pending; and (viii) U.S. Provisional App. 62/312,350, filed Mar. 23, 2016, titled "Voice Control of a Media Playback System," and which is currently pending. The entire contents of the 62/298,418; 62/298,433; 62/298,439; 62/298,425; 62/298,350; 62/298,388; 62/298,393; and 62/312,350 applications are incorporated herein by reference. This application also incorporates by reference the entire contents of U.S. Provisional App. 62/298,410, filed Feb. 22, 2016, and titled "Default Playback Device(s)."

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005 . The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
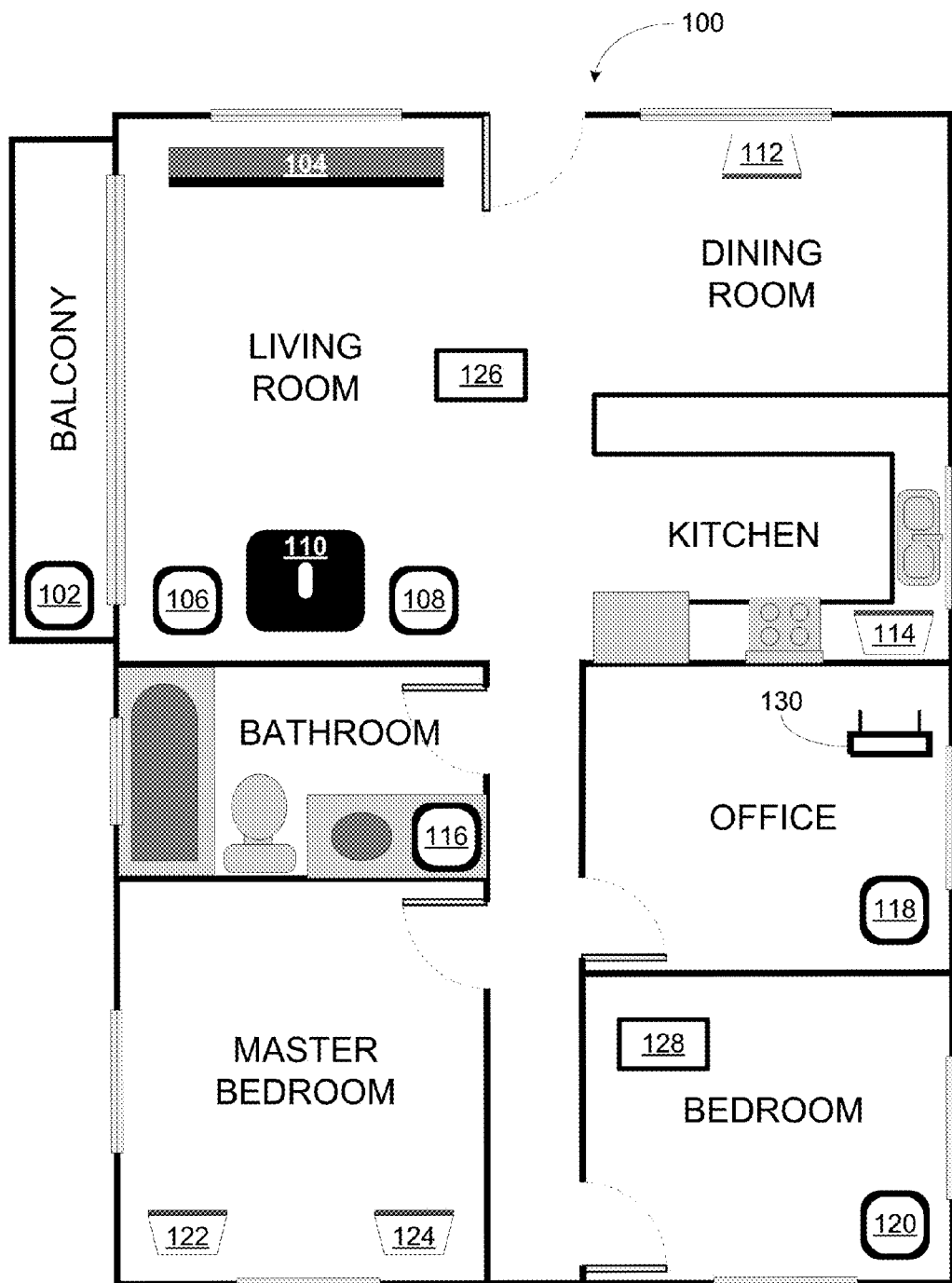
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

When a media playback device is configured to be controlled by voice commands received via a networked microphone system, it is sometimes advantageous for the media playback system to share metadata with the networked microphone system, and vice versa, for the purpose of effectuating voice control of the media playback system via the networked microphone system. For example, when the networked microphone system receives a voice command to "Play this song in my office now," the networked microphone system needs to know what "this song" is and which media playback device(s) is in the user's office. One way for the networked microphone system to figure out what "this song" is and which media playback device(s) is in the user's office is for the networked microphone system to obtain metadata from the media playback system relating to (i) the song that the media playback system is currently playing and (ii) the configuration of the media playback devices in the media playback system.

Some embodiments described herein include a media playback system (or perhaps one or more components thereof) providing metadata to a networked microphone system (or perhaps one or more components thereof) to facilitate voice control of the media playback system by the networked microphone system.

One aspect includes establishing a metadata exchange channel between a media playback system and a networked microphone system. In some embodiments, the media playback system includes one or more media playback devices alone or in combination with a media playback system server, and the networked microphone system includes one or more networked microphone devices alone or in combination with a networked microphone system server. In some embodiments, one or both of the media playback system server and/or the networked microphone system server are cloud-based server systems.

In operation, the metadata exchange channel may be any type of communication channel between one or more components of the media playback system and one or more components of the networked microphone system as described herein. In some embodiments, the metadata exchange channel is a communication session between one or more components of the media playback system and one or more components of the networked microphone system. The communication session may or may not be especially configured for the exchange of metadata. In practice, the media playback system and the networked microphone system may use any type of communications mechanism now known or later developed to exchange metadata between the two systems, including but not limited to communication paths, links, channels, and/or sessions (e.g., one or more paths, links, and/or channels may support a session).

After establishing the metadata exchange channel, or at a minimum, after configuring the media playback system to share or otherwise provide metadata to the networked microphone system, the media playback system provides metadata associated with the media playback system to the networked microphone system in response to a metadata exchange triggering event. In some embodiments, the metadata exchange triggering event is any one or more of (i) the media playback system playing back a new media content item (e.g., a new audio track), (ii) the media playback system receiving a context-specific playback command via the networked microphone system, (iii) the media playback system receiving a context-specific request for information via the networked microphone system, and/or (iv) passage of a defined time period of time.

Some embodiments include the networked media playback system providing the metadata to the networked microphone system via the metadata exchange channel. For example, the media playback system may provide metadata associated with the media playback system to the networked microphone system via the metadata exchange channel by one or both of: (i) transmitting metadata from one or more components of the media playback system to one or more components of the networked microphone system via the metadata exchange channel and/or (ii) granting one or more components of the networked microphone system access to metadata stored on one or more components of the media playback system via the metadata exchange channel.

In some embodiments, the metadata that the media playback system provides to the networked microphone system includes one or more of: (i) one or more configuration parameters of the media playback system, (ii) information about audio content currently playing via the media playback system, (iii) historical information about audio content played by the media playback system, (iv) user preference information relating to audio content, (v) user preference information relating to media playback system configuration, and/or (vi) any other metadata, including but not limited to other metadata disclosed and/or described herein.

Some embodiments may additionally include the networked microphone system providing metadata to the media playback system via the metadata exchange channel. For example, the networked microphone system may provide metadata associated with the networked microphone system via the metadata exchange channel by one or both of (i) transmitting metadata from one or more components of the networked microphone system to one or more components of the media playback system via the metadata exchange channel and/or (ii) granting one or more components of the media playback system access to metadata stored on one or more components of the networked microphone system via the metadata exchange channel.

In some embodiments, the metadata that the networked microphone system provides to the media playback system includes one or more of (i) one or more configuration parameters of the networked microphone system, (ii) configuration parameters of individual networked microphone devices of the networked microphone system, (iii) historical information about who has used (e.g., which user or users) the networked microphone system to control the media playback system and when, (iv) the voice commands received by the networked microphone system, and/or (v) any other metadata, including but not limited to other metadata disclosed and/or described herein.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
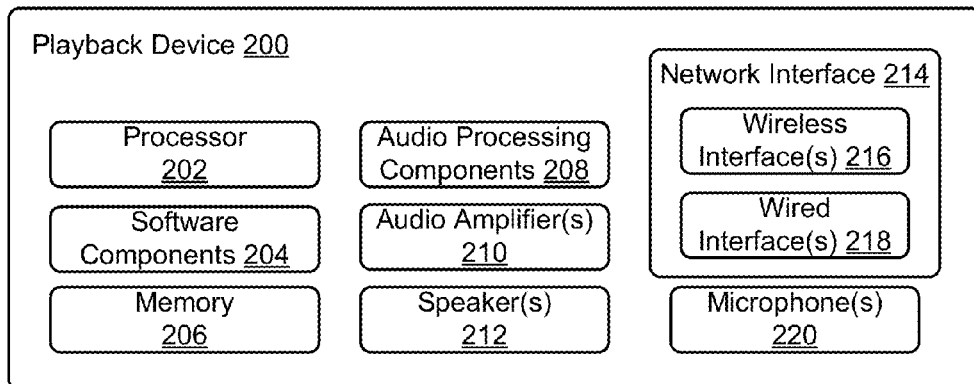
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include one or more processors 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the one or more processors 202 may be one or more clock-driven computing components configured to process input data according to instructions stored in the memory 206. The memory 206 may be a tangible computer-readable medium configured to store instructions executable by the one or more processors 202. For instance, the memory 206 may be data storage that can be loaded with one or more of the software components 204 executable by the one or more processors 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the one or more processors 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. The playback device 200 may transmit metadata to and/or receive metadata from other devices on the network, including but not limited to components of the networked microphone system disclosed and described herein. In one example, the audio content and other signals (e.g., metadata and other signals) transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render (e.g., play back) audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
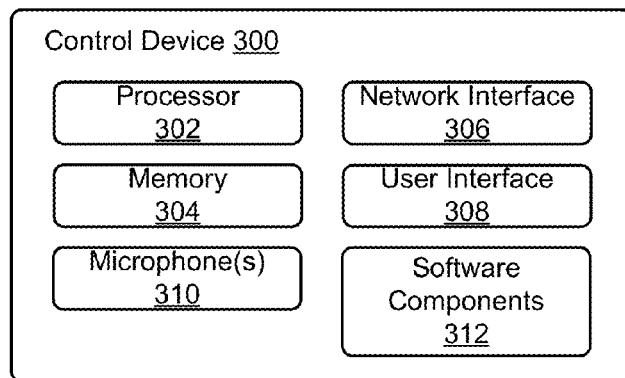
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include one or more processors 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The one or more processors 302 may be configured to perform functions relevant to facilitating user access, control, and configuration of the media playback system 100. The memory 304 may be data storage that can be loaded with one or more of the software components executable by the one or more processors 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
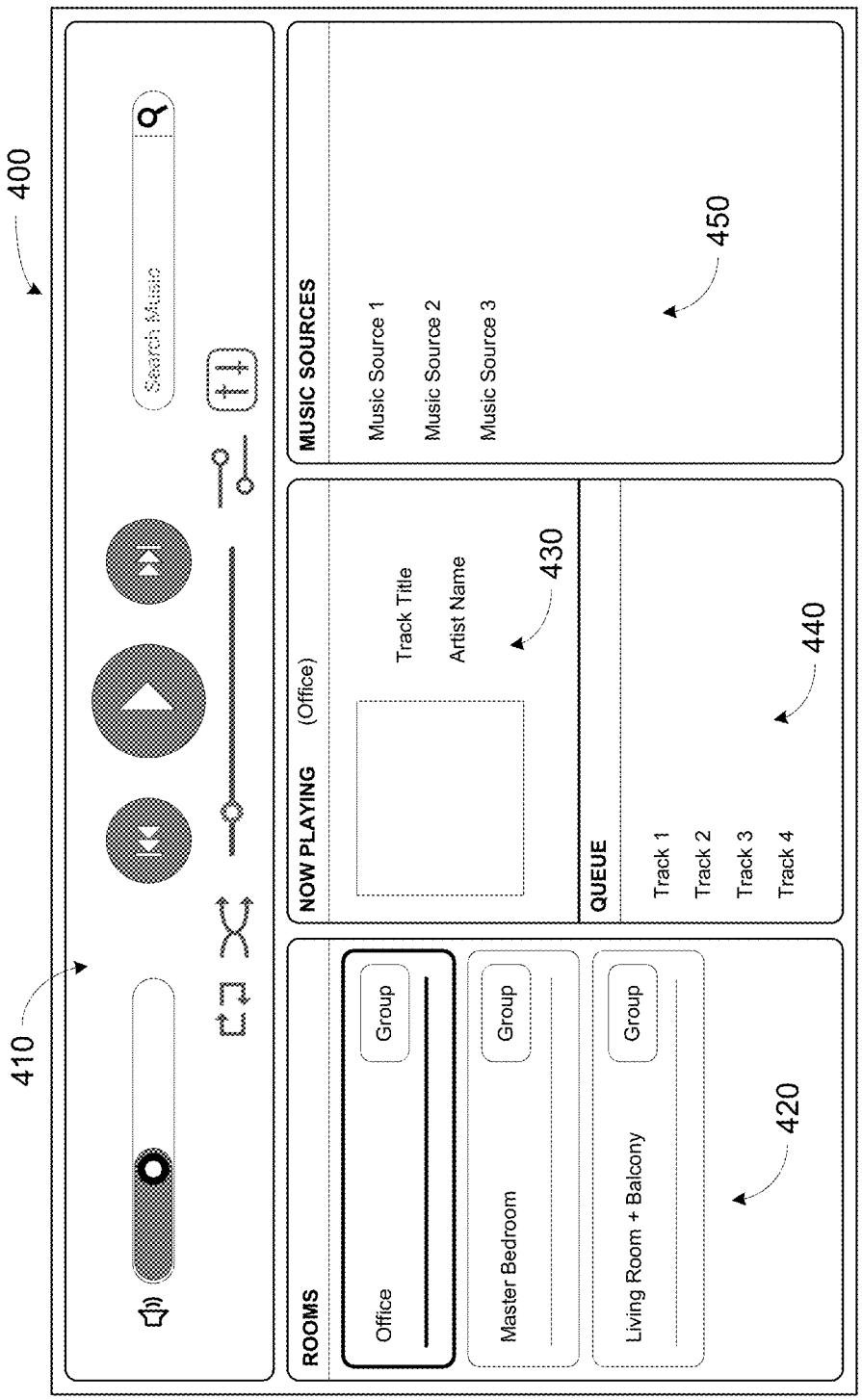
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
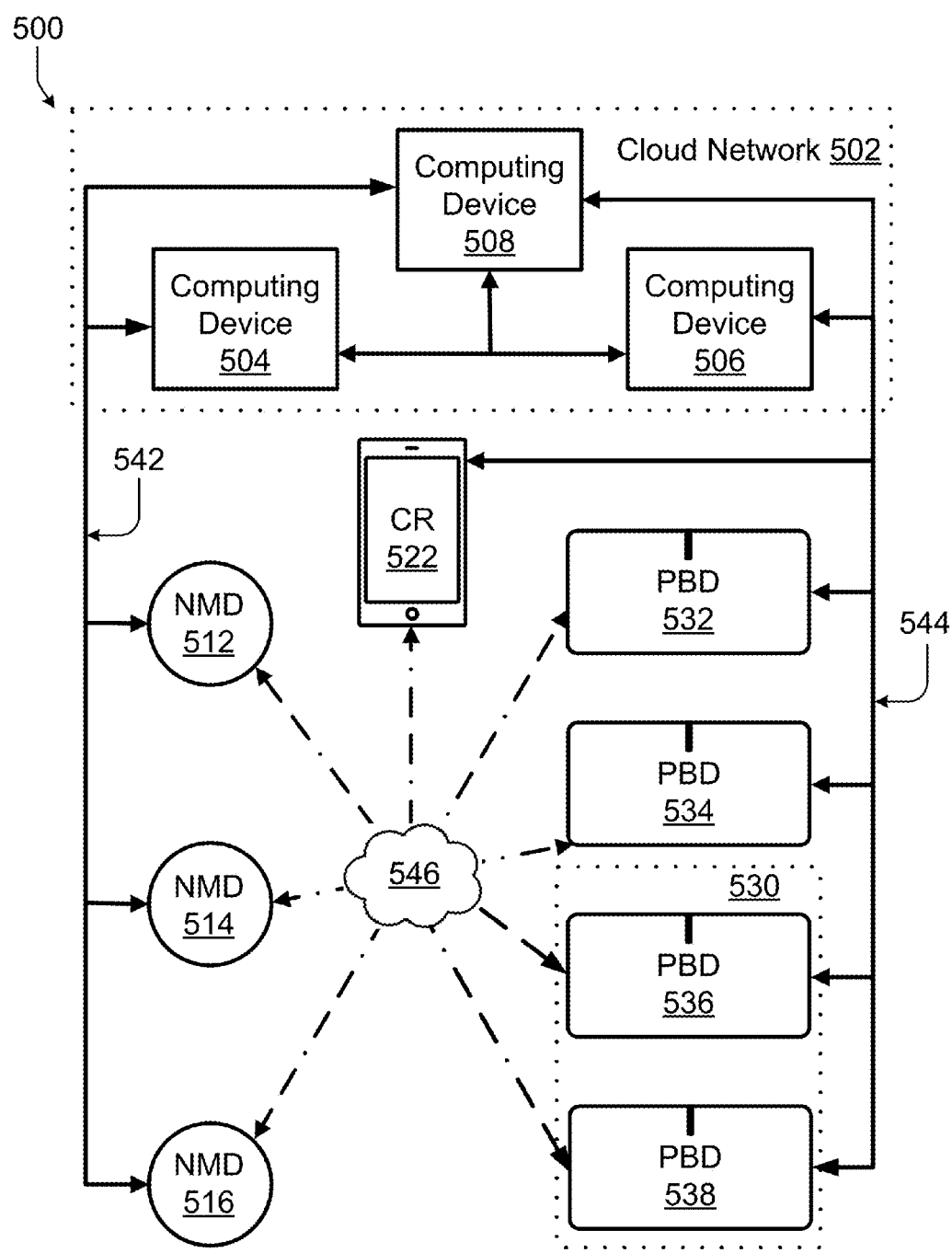
FIG. 5 shows an example plurality of network devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional (or fewer) devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300.

Further, in some cases, one or more of NMDs 512, 514, and 516 may be the playback device 200 or network device 300. In an example, one or more of NMDs 512, 514, and/or 516 may include multiple microphones arranged in a microphone array. In some embodiments, one or more of NMDs 512, 514, and/or 516 may be a microphone on a mobile computing device (e.g., a smartphone, tablet, or other computing device).

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506, and computing device 506 in turn may then control one or more of PBDs 532-538 to execute the command. In another example, the computing device 504 may convert the voice input to an equivalent text command, and then subsequently transmit the text command to the computing device 506. The computing device 506 may then parse the text command to identify one or more playback commands, and then computing device 506 may additionally control one or more of PBDs 532-538 to execute the command.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
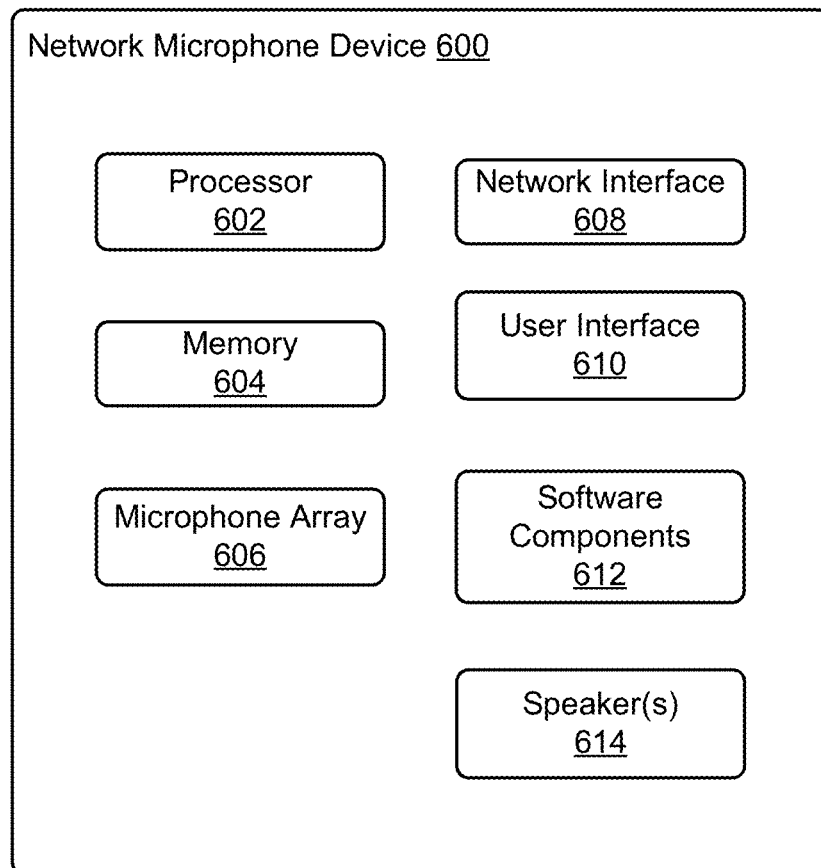
FIG. 6 shows a function block diagram of an example network microphone device.

FIG. 6 shows a function block diagram of an example network microphone device 600 that may be configured to be one or more of NMDs 512, 514, and 516 of FIG. 5. As shown, the network microphone device 600 includes one or more processors 602, memory 604, a microphone array 606 (e.g., one or more microphones), a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The one or more processors 602 may include one or more processors and/or controllers, which may take the form of a general or special-purpose processor or controller. For instance, the one or more processors 602 may include microprocessors, microcontrollers, application-specific integrated circuits, digital signal processors, and the like. The memory 604 may be data storage that can be loaded with one or more of the software components executable by the one or more processors 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing devices 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Systems and Methods

To facilitate voice control of the media playback system, it is desirable in some instances for the media playback system to share, exchange, or otherwise provide metadata to the networked microphone system and/or vice versa. In some embodiments, the media playback system includes one or more of PBDs 532, 534, 536, and 538 and computing device 506 (which is configured as a media playback system server), and the networked microphone system includes one or more of NMDs 512, 514, and 516 and computing device 504 (which is configured as a networked microphone system server).

Examples of metadata shared from the media playback system to the networked microphone system include any one or more of: (i) one or more configuration parameters of the media playback system, (ii) information about audio content currently playing via the media playback system, (iii) historical information about audio content played by the media playback system, (iv) user preference information relating to audio content, (v) user preference information relating to media playback system configuration, and (vi) other metadata, including but not limited to any of the metadata disclosed or described herein. Examples of metadata shared from the networked microphone system to the media playback system may include any one or more of: (i) one or more configuration parameters of the networked microphone system, (ii) which users have used the networked microphone system and perhaps when, (iii) the types of commands and/or requests for information received by the networked microphone system, (iv) information from other information sources, e.g., local weather, sports scores, news, local concert information, whether a user purchased an album via the networked microphone system that was previously playing via the media playback system, and/or (v) other metadata, including but not limited to any of the metadata disclosed or described herein. The metadata shared between the networked microphone system and the media playback system may involve any characteristic, configuration, or other type of information pertaining to one or more of the media playback system and the networked microphone system, and so other examples of such metadata may exist.

Examples of configuration parameters of the media playback system include zones where individual PBDs 532-538 are located (e.g., kitchen, balcony, living room, bedroom, and so on, as shown in FIG. 1) or names given to individual PBDs. Configuration parameters may also include information about which PBDs have been grouped in synchrony groups, grouped into a consolidated playback device, and/or grouped into a bonded group of playback devices. Configuration parameters may also include information about what channel or channels of audio a particular PBD is configured to play (e.g., "left channel," or "rear left channel," among other examples). Configuration parameters may also include equalization settings for individual PBDs or groups of PBDs. In some embodiments, the equalization settings for individual PBDs or groups of PBDs may include Sonos Trueplay™ settings for individual PBDs or groups of PBDs. Configuration parameters may also include orientation state information for individual PBDs, e.g., whether a particular PBD is standing right side up, upside down, or on its side. Configuration parameters may also include networking information, e.g., whether a particular PBD is operating as a group coordinator (e.g., a "master") in a group of playback devices or is operating as a group member (e.g., a "slave") in a group of playback devices. Configuration parameters may also include a variety of other physical state information such as a battery level of a PBD, whether the PBD is physically attached to an electrical power outlet, whether the PBD is attached to a base, and/or whether the PBD is currently in motion (i.e., being moved).

Configuration parameters may also include available (e.g., previously stored) zone scenes into which the individual PBDs can be configured. An individual zone scene may include a particular grouping of PBDs configured with a particular set of configuration parameters. For example, an "Evening Jazz" zone scene may (i) group PBDs in the kitchen, dining room, living room, and balcony (see FIG. 1) into a synchrony group so that all of the PBDs 102-114 are configured to play the same media content in synchrony, (ii) configure the volume and/or equalization settings for the individual PBDs 102-114 to account for the fact that all of the PBDs 102-114 are playing together, (iii) configure the equalizer settings for the individual PBDs 102-114 to a "jazz" setting, and/or (iv) load jazz tracks into the playback queue for the synchrony group of PBDs 102-114 from one or more playlists and/or music subscription services. Zone scenes are described in more detail in U.S. Pat. No. 8,483,853 titled "Controlling and manipulating groupings in a multi-zone media system," and pending application Ser. No. 14/737,199 titled "Multiple Groupings in a Playback System." The entire contents of the U.S. Pat. No. 8,483,853 patent and the Ser. No. 14/737,199 application are incorporated herein by reference for all purposes.

Examples of information about audio content currently playing via the media playback system include (i) the track, (ii) the title, (iii) the artist, (iv) the performer, (v) the author, (vi) the album, (vii) the genre, (viii) the year, (ix) the audio information source/media service providing the track to the media playback system, (x) how many times the track has been played, (xi) whether the track is a user "favorite", (xii) the playlist (if any) that the track appears in, (xiii) the user who initiated playback of the track, (xiv) a current playback progression (e.g., playback time stamp) of the track, (xv) whether and how many times the track has been "liked" by listeners (and perhaps when), and/or (xvi) any other information about the currently playing track. Examples of historical information about audio content played by the media playback system include any or all of the above-described metadata about audio content in combination with dates and times when individual audio content was played by the media playback system as well as perhaps the particular PBD or PBDs that played the content. Information about the audio currently or previously played may also include other contextual information regarding the playback such as "played during Larry's party," "played on Christmas day," or "played while raining outside," among other examples.

Examples of user preference information relating to audio content include (i) preferred audio information source or music service to obtain music from (e.g., Spotify, Pandora, local library of tracks, and so on), (ii) preferred versions of songs (e.g., a live version versus a studio version, a version of the song by a particular artist or group), (iii) preferred styles or genres of music, and (iv) other user preferences relating to audio content.

Examples of user preference information relating to media playback system configuration include (i) preferred playback volume, (ii) preferred equalization settings, (iii) preferred synchrony group arrangements, (iv) preferred zone scenes, and/or (v) other media playback system settings.

In some embodiments, sharing any of the above-described metadata (and perhaps other metadata) between the media playback system and the networked microphone system includes first establishing a metadata exchange channel between the media playback system and the networked microphone system. In operation, the metadata exchange channel may be any type of communication channel between one or more components of the media playback system and one or more components of the networked microphone system as described herein.

In some embodiments, the metadata exchange channel is a communication session occurring between one or more components of the media playback system and one or more components of the networked microphone system, and establishing the metadata exchange channel includes establishing the communication session. The communication session may or may not be especially configured for or otherwise adapted to the exchange of metadata. In practice, the media playback system and the networked microphone system may use any type of communications mechanism now known or later developed to exchange metadata between the two systems, including but not limited to communication paths, links, channels, and/or sessions (e.g., one or more paths, links, and/or channels may support a session).

In some embodiments, the metadata exchange channel can be any of (i) a one way connection from the media playback system to the networked microphone system, (ii) a one way connection from the networked microphone system to the media playback system, (iii) a two-way connection between (i.e., to and from) the media playback system and the networked microphone system, or (iv) a multi-way connection between multiple components of the media playback system and multiple components of the networked microphone system.

In some embodiments, any one or more of PBDs 532-538, CR 522, and computing device 506 may transmit metadata via one or more separate or perhaps shared metadata multicast channels, where any other of PBDs 532-538, CR 522, computing device 506, NMDs 512-516, and computing device 504 can subscribe to one or more of the metadata multicast channels to receive metadata transmitted from components of the media playback system. Similarly, any one or more of NMDs 512-513 and computing device 504 may transmit metadata via one or more separate or shared metadata multicast channels, where any of other NMDs 512-516, computing device 504, PBDs 532-538, CR 522, and computing device 506 can subscribe to one or more of the metadata multicast channels to receive metadata transmitted from components of the networked microphone system. In some embodiments, the collection of metadata multicast channels may form a metadata mesh network via which components of the networked microphone system and components of the media playback system share metadata with each other.

In some embodiments, establishing a metadata exchange channel comprises configuring one or more components of the media playback system (i.e., any one or more of PBDs 532, 534, 536, 538, CR 522, and/or computing device 506, which is configured as a media playback system server) to communicate with one or more components of the networked microphone system (i.e., any one or more of NMDs 512, 514, 516, and/or computing device 504, which is configured as a networked microphone system server) via a communication path, link, channel, and/or session. Establishing the metadata exchange channel may additionally or alternatively include configuring one or more components of the networked microphone system (i.e., any of NMDs 512, 514, 516, and/or computing device 504) to communication with one or more components of the media playback system (i.e., any of PBDs 532, 534, 536, 538, CR 522, and/or computing device 506) via a communication path, link, channel, and/or session.

As described earlier, in some embodiments, the metadata exchange channel is a separate and also perhaps dedicated metadata exchange channel. However, in other embodiments, the metadata exchange channel may include one or more communication paths, connections, links, or similar communications connections between the media playback system and the networked microphone system which can be used to exchange metadata or any other information, content, or other data between components of the media playback system and components of the networked microphone system in a unidirectional, bidirectional, and/or multi-directional manner.

For example, with reference to FIG. 5, establishing a metadata exchange channel between the media playback system and the networked microphone system may include establishing a communication session between one or more components of the media playback system (i.e., any of PBDs 532-538 and/or computing device 506) to communicate with one or more components of the networked microphone system (i.e., any of NMDs 512-513 and/or computing device 504) via one or more of (i) local network 546, (ii) communications path 544, (iii) communications path 542, (iv) cloud network 502, and/or (v) any other type of communications path, link, or other connection now known or later developed.

In operation, after establishing the metadata exchange channel, the media playback system provides metadata associated with the media playback system to the networked microphone system via the metadata exchange channel in response to experiencing a metadata exchange triggering event.

In some embodiments, the metadata exchange triggering event comprises one or more of the PBDs of the media playback system playing back a new media content item. For example, in such embodiments, the media playback system (i.e., any of the PBDs 532-538 or the computing device 506) sends any of the above-described metadata to the networked microphone system (i.e., any of NMDs 512-516 or computing device 504) whenever any one of the PBDs 532-538 of media playback system begins playing a new media track. In this manner, playback of the new media track is the metadata exchange triggering event causing the media playback system to send metadata to the networked microphone system. In such embodiments, the media playback system sends metadata to the networked microphone system as each new track is played, regardless of whether the networked microphone system has specifically requested any metadata. This implementation can be advantageous in scenarios where the networked microphone system (or perhaps a component thereof, e.g., computing device 504) is configured to store historical metadata and/or other metadata about the media playback system and/or the media played by the media playback system.

In some embodiments, the media playback system may initiate playback of a media track in response to a voice command to play the media track received via the networked microphone system. Additionally or alternatively, the media playback system may initiate playback of a media track in response to a command to play the media track received via a computing device configured to control the media playback system, such as CR 522. In either instance, initiating playback of the media track may cause the media playback system (i.e., any one or more of the PBDs 532-538 playing the media track, the computing device configured to control the media playback system (e.g., CR 522), and/or computing device 506, individually or in combination) to transmit metadata to the networked microphone system (i.e., any one or more of the NMDs 512-516 or computing device 504, individually or in combination).

In some embodiments, the metadata exchange triggering event additionally or alternatively comprises the media playback system receiving a request for metadata in response to the networked microphone system receiving a context-specific command (or perhaps other types of command) from a user. An example of a context-specific command is "Save this song to my favorites playlist." The command is context specific because the networked microphone system needs to know what "this song" is so that the networked microphone system can instruct the media playback system to add "this song" to the user's favorites playlist.

To determine what "this song" is, the networked microphone system requests metadata about the audio track that the media playback system is currently playing. If the media playback system has multiple PBDs where different PBDs located in different zones are playing different audio tracks (see FIG. 1), then functions directed to determining what "this song" is may be required. For instance, if the NMD of the networked microphone system that received the context-specific command is paired with a kitchen zone (or otherwise connected to or associated with the kitchen zone), then the networked microphone system can retrieve metadata for the audio track currently played by the PBD (or PBDs) in the kitchen zone. Thus, in this example, processing the context-specific command requires the networked microphone system to obtain metadata about the configuration of the media playback system (i.e., which PBDs are in the kitchen zone), metadata about the audio content that the PBD (or PBDs) in the kitchen is currently playing, and also perhaps metadata about the user's playlists (i.e., user preference metadata).

Another example of a context-specific command is "Play the songs that were playing in the Living Room last Friday night." The command is context specific because the networked microphone system needs to know what songs that the media playback system was playing in the living room zone last Friday evening so that the networked microphone system can instruct the media playback system to play those songs again now.

To determine the "songs that were playing in the Living Room last Friday night", the networked microphone system requests metadata about the history of the audio tracks that the PBD (or PBDs) in the living room zone played on the most-recent Friday. If the media playback system has multiple PBDs where different PBDs located in different zones can play different audio tracks (see FIG. 1), then determining which PBD (or PBDs) should play the "songs that were playing in the Living Room last Friday night" can pose an additional challenge. But if the NMD of the networked microphone system that received the context-specific playback command is paired with the office zone (or otherwise connected to or associated with the office zone), then the networked microphone system can retrieve metadata about the audio tracks that the PBD (or PBDs) in the living room zone played on the most-recent Friday, and then instruct the PBD (or PBDs) in the office to play those audio tracks now. Thus, in this example, processing the context-specific command requires the networked microphone system to obtain metadata about the historical configuration of the media playback system (i.e., which PBDs are in the living room zone, or at least were in the living room zone last Friday), metadata about the audio content that the PBD (or PBDs) in the living room played last Friday, and also perhaps metadata about which PBD (or PBDs) are currently in the office zone.

Another example of a context-specific command is "Add this song to the queue in my bedroom." The command is context specific because the networked microphone system needs to know what "this song" is and which bedroom is "my bedroom" so that the media playback system can add the correct song to the playback queue on the correct PBD in the media playback system.

To determine what "this song" is, the networked microphone system requests metadata about the audio track that the media playback system is currently playing. If the media playback system has multiple PBDs where different PBDs located in different zones are playing different audio tracks (see FIG. 1), then functions directed to determining what "this song" is may be required. For instance, if the NMD of the networked microphone system that received the context-specific command is paired with an office zone (or otherwise connected to or associated with the office zone), then the networked microphone system can retrieve metadata for the audio track currently played by the PBD (or PBDs) in the office zone.

To determine which bedroom is "my bedroom," the networked microphone system may perform voice recognition on the voice command to determine who spoke the voice command, access metadata about the user (from the user profile for example) stored by the media playback system to determine which bedroom zone corresponds to that particular user, access metadata about the configuration of the media playback device to determine which PBD (or PBDs) are in the bedroom zone corresponding to the user, access metadata about the configuration of the PBD (or PBDs) in the bedroom zone to determine which PBD is the master zone player for the bedroom zone that stores the playback queue for the PBD (or PBDs) in the bedroom zone, and finally metadata about the playback queue for that PBD in the bedroom zone corresponding to the user.

Thus, in this example, processing the context-specific command requires the networked microphone system to obtain metadata about registered users of the media playback system, metadata about the configuration of the media playback system (i.e., which PBDs are in the office and bedroom zones), metadata about the audio content that the PBD (or PBDs) in the office is currently playing, metadata about the playback queue for the PDB (or PBDs) in the bedroom zone, and/or perhaps other metadata in order to add the song playing in the office to the playback queue for the user's bedroom.

In yet another example of a context-specific command (or information request) is "When is this band playing in town next?" The command is context specific because the networked microphone system needs to know what "this band" and this "town" are so that the networked microphone system can provide the user with an answer, or perhaps instruct the media playback device to provide the user with an answer.

To determine what "this band" is, the networked microphone system requests metadata about the audio track that the media playback system is currently playing. If the media playback system has multiple PBDs where different PBDs located in different zones are playing different audio tracks (see FIG. 1), then functions directed to determining what "this band" is may be required. For instance, if the NMD of the networked microphone system that received the context-specific command is paired with an office zone (or otherwise connected to or associated with the office zone), then the networked microphone system can retrieve metadata for the audio track currently played by the PBD (or PBDs) in the office zone.

To determine what this "town" is, the networked microphone system may request metadata about the location of the media playback system, or the networked microphone system may use its own configuration information. Either way, once the networked microphone system knows "this band" and the "town," the networked microphone system can query one or more third-party information sources to obtain tour dates for "this band" and provide the next date to the user, or perhaps instruct the media playback system to inform the user.

For example, in some embodiments, the networked microphone system may instruct the media playback system (or at least a particular PBD of the media playback system) to provide an audible response to the question of "When is this band playing in town next?" In operation, one or more PBDs of the media playback system may provide an audible answer that "The Rolling Stones play in Chicago next on November 15th." In some embodiments, the media playback device, under the control the networked microphone system, may additionally ask the user "Would you like to purchase tickets?", and if the user replies, "Yes," then the networked microphone system may email the user a link to purchase tickets. This follow on interaction with the user may also require the networked microphone system to access metadata about registered users of the media playback system to obtain the email address to use for sending the link for purchasing the concert tickets.

Another example of a context-specific information request is "What band is this?" The information request is context specific because the networked microphone system needs to know what song is currently playing so that the networked microphone system can either (i) inform the user of the artist of the currently playing track or (ii) instruct the media playback system to inform the user of the artist for the currently playing track. And like the earlier examples, if the media playback system has multiple PBDs where different PBDs located in different zones can play different audio tracks (see FIG. 1), then determining which PBD (or PBDs)

is playing the song of interest can pose an additional challenge. But if the NMD that received the context-specific information request is paired with the living room zone (or otherwise connected to or associated with the living room zone), then the networked microphone system can retrieve metadata about the audio track that the PBD (or PBDs) in the living room zone is currently playing. Thus, in this example, to process and respond to the context-specific information request, the networked microphone system must obtain metadata about the configuration of the media playback system (i.e., which PBDs are in the living room zone) and metadata about the audio content that the PBD (or PBDs) in the living room is playing.

In some embodiments, the metadata exchange triggering event comprises passage of a defined time period. For example, in some embodiments, the media playback system may be configured to send any (or perhaps all) of the types of metadata described herein to the networked microphone system every 1 second, 10 seconds, 1 minute, 15 minutes, every 30 minutes, every hour, or some other timeframe.

In some embodiments, the media playback system may be configured to send metadata to the networked microphone system whenever there is any change to the media playback system. For example, the media playback system may be configured to send metadata to the networked microphone system whenever (i) there is a configuration change to the media playback system, such as creating or removing a synchrony group, establishing a zone scene, adding or removing a media playback device to the media playback system, raising or lowering the volume, changing equalization settings, or any other configuration change, (ii) starting or stopping playback of a media track, advancing to a next track, skipping a track, repeating a track, or other playback commands, (iii) receiving an indication that a user "likes" or "dislikes" (e.g., a thumbs up or thumbs down indication) a currently playing track, album, or playlist, (iv) adding a track or album to or removing a track or album from a playlist, and/or (v) adding a track, album, or playlist to or removing a track, album, or playlist from a playback queue. In some embodiments, the media playback system may send metadata to the networked microphone system in a continuous, substantially continuous, or semi-continuous fashion as different PBDs in the media playback system are configured and reconfigured while playing tracks and performing other media management functions.

In some embodiments, the media playback system providing metadata associated with the media playback system (and/or media played by media playback system) to the networked microphone system via the metadata exchange channel comprises the media playback system (or perhaps one or more components of the media playback system) transmitting metadata to the networked microphone system (or perhaps one or more components of the networked microphone system). For example, the media playback system transmitting metadata to the networked microphone system may include any one or more of (i) one of the PBDs (i.e., any of PBDs 532-538) sending metadata to any of the NMDs (i.e., any of NMDs 512-516) via local network 546; (ii) computing device 506 sending metadata to computing device 504; (iii) the CR 522 sending metadata to any of the NMDs 512-516 via network 546; (iv) the CR 522 sending metadata to computing device 504; (v) one of the PBDs 532-538 sending metadata to computing device 506 via communications link 544, and the computing device 506 in turn sending the metadata to computing device 504; and (vi) one of the PBDs 532-538 sending metadata to one of the NMDs 512-516 via network 546, and one of the NMDs 512-516 sending the metadata to computing device 504 via communication link 546. Every other scenario where any one or more components (PBDs 532-538 and computing device 506) of the media playback system sends, shares, transfers, transmits, or otherwise provides metadata to any one or more components (NMDs 512-516 and computing device 504) of the networked microphone system via any of the communications paths (544, 542, 546) shown in FIG. 5 (or any other communications path) is possible and is contemplated herein.

In some embodiments, the media playback system providing metadata associated with the media playback system (and/or media played by media playback system) to the networked microphone system via the metadata exchange channel comprises the media playback system (or perhaps one or more components of the media playback system) granting the networked microphone system (or perhaps one or more components of the networked microphone system) access to metadata via the metadata exchange channel. For example, the media playback system granting the networked microphone system access to metadata may include any one or more of (i) one of the PBDs (i.e., any of PBDs 532-538) granting any of the NMDs (i.e., any of NMDs 512-516) access to metadata via local network 546; (ii) computing device 506 granting computing device 504 access to metadata; (iii) the CR 522 granting any of the NMDs 512-516 access to metadata via network 546; (iv) the CR 522 granting computing device 504 access to metadata; (v) one of the PBDs 532-538 granting computing device 506 access to metadata via communications link 544, and the computing device 506 in turn granting computing device 504 access to metadata; and (vi) one of the PBDs 532-538 granting one of the NMDs 512-516 access to metadata via network 546, and one of the NMDs 512-516 sending the metadata to computing device 504 via communication link 546. Every other scenario where any one or more components (PBDs 532-538 and computing device 506) of the media playback system grants any one or more components (NMDs 512-516 and computing device 504) of the networked microphone system access to metadata via any of the communications paths (544, 542, 546) shown in FIG. 5 (or any other communications) is possible and is contemplated herein.

Figure 7:
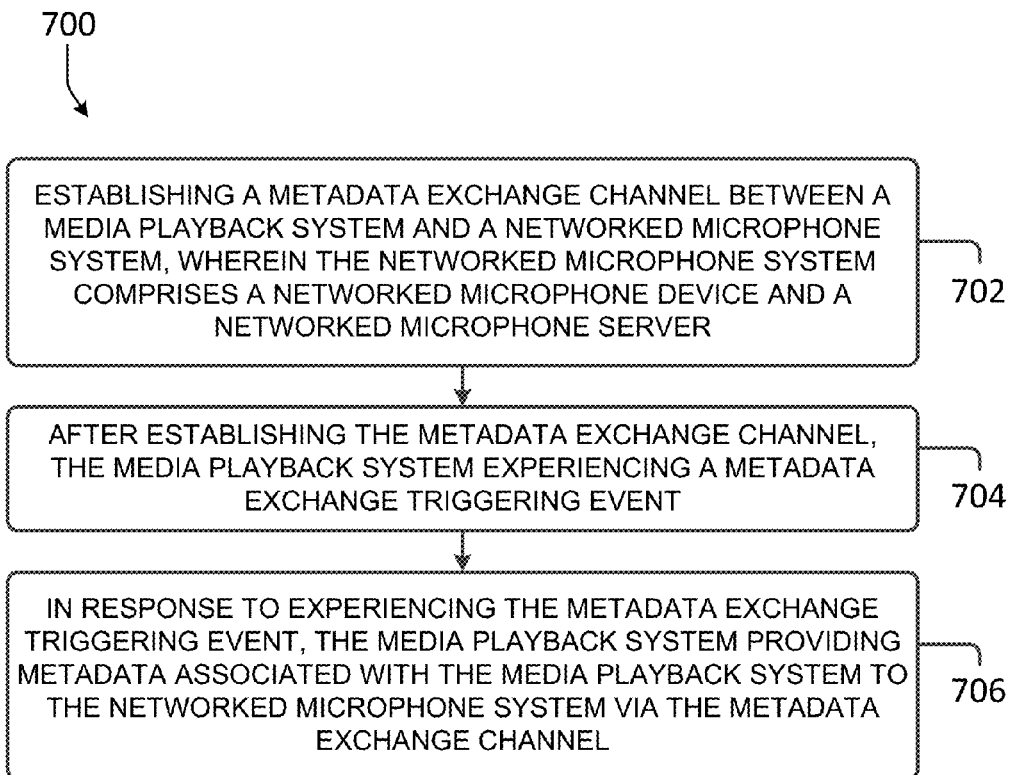
FIG. 7 shows an example method according to some embodiments.

Method 700 shown in FIG. 7 presents an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, and/or the NMD shown in FIG. 6. Method 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 7 may represent circuitry that is wired to perform the specific logical functions in the process.

Method 700 begins at block 702, which includes establishing a metadata exchange channel between a media playback system and a networked microphone system, wherein the networked microphone system comprises a networked microphone device and a networked microphone server.

The metadata exchange channel may be any type of communication channel between one or more components of the media playback system and one or more components of the networked microphone system as described herein. In some embodiments, the metadata exchange channel is a communication session between one or more components of the media playback system and one or more components of the networked microphone system. In some embodiments, the communication session may be especially configured for the exchange of metadata. However, in other embodiments, the media playback system and the networked microphone system may use any type of communications mechanism now known or later developed to exchange metadata between the two systems.

In some embodiments, the media playback system comprises at least one media playback device, and establishing a metadata exchange channel between a media playback system and a networked microphone system comprises establishing the metadata exchange channel between the at least one media playback device and at least one of (i) the networked microphone device and (ii) the networked microphone server.

In alternative embodiments, the media playback system further comprises a media playback server connected to the at least one media playback device, and establishing a metadata exchange channel between a media playback system and a networked microphone system comprises establishing the metadata exchange channel between the media playback server and at least one of (i) the networked microphone device and (ii) the networked microphone server.

Next, method 700 advances to block 704, which includes, after establishing the metadata exchange channel, the media playback system experiencing a metadata exchange triggering event. In operation, the metadata exchange triggering event may include any of (i) the media playback system playing back a new media content item, (ii) the media playback system receiving a context-specific playback command via the networked microphone system, (iii) the media playback system receiving a context-specific information request via the networked microphone system, (iv) passage of a defined period of time, and/or (v) other configuration changes, state changes, actions, inputs, or requests that could be used to trigger metadata exchange. In some embodiments, the media playback system may send metadata to the networked microphone system on an ongoing basis.

Block 704 may additionally or alternative include, after establishing the metadata exchange channel, the networked microphone system experiencing a metadata exchange triggering event. In operation, the metadata exchange triggering event may include any of (i) the networked microphone system receiving a new voice command, including but not limited to a context-specific voice command, (ii) the networked microphone system receiving a new voice request for information, including but not limited to a context-specific voice request for information, (iii) a configuration change of the networked microphone system, (iv) passage of a defined period of time, and/or (v) other configuration changes, state changes, actions, inputs, or requests that could be used to trigger metadata exchange. In some embodiments, the networked microphone system may send metadata to the media playback system on an ongoing basis.

Finally, method 700 advances to block 706, which includes in response to experiencing the metadata exchange triggering event, the media playback system providing metadata associated with the media playback system to the networked microphone system via the metadata exchange channel.

In operation, the metadata comprises at least one of (i) one or more configuration parameters of the media playback system, (ii) information about audio content currently playing via the media playback system, (iii) historical information about audio content played by the media playback system, (iv) user preference information relating to audio content, (v) user preference information relating to media playback system configuration, and/or (vi) any other metadata disclosed and/or described herein.

In some embodiments, the media playback system providing metadata associated with the media playback system to the networked microphone system via the metadata exchange channel comprises at least one of (i) the media playback system transmitting metadata to the networked microphone system via the metadata exchange channel or (ii) the media playback system granting the networked microphone system access to selected metadata via the metadata exchange channel.

In some embodiments, block 706 may additionally or alternatively include, in response to experiencing the metadata exchange triggering event, the networked microphone system providing metadata associated with the networked microphone system to the media playback system via the metadata exchange channel.

In operation, the metadata comprises at least one of (i) one or more configuration parameters of the networked microphone system, (ii) information about voice commands and requests received via the networked microphone system, (iii) historical information about voice commands and requests received via the networked microphone system, (iv) user preference information relating to the networked microphone system, (v) user preference information relating to the networked microphone system configuration, and/or (vi) any other metadata disclosed and/or described herein.

In some embodiments, the networked microphone system providing metadata associated with the networked microphone system to the media playback system via the metadata exchange channel comprises at least one of (i) the networked microphone system transmitting metadata to the media playback system via the metadata exchange channel or (ii) the networked microphone system granting the media playback system access to selected metadata via the metadata exchange channel.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. Tangible, non-transitory computer-readable media having instructions encoded thereon, wherein the instructions, when executed by one or more processors, cause a network microphone device of a networked microphone system to perform a method comprising:
    establishing a metadata exchange channel between a media playback system and the networked microphone system, wherein the network microphone device and the media playback system are on a local area network;
    obtaining from the media playback system via the metadata exchange channel, metadata associated with the media playback system;
    receiving a voice input comprising a context-specific request corresponding to media played back by the media playback system; and
    in response to receiving the voice input, transmitting to a network microphone server of the networked microphone system, a request based on (i) the voice input and (ii) the metadata associated with the media playback system.

2. The tangible, non-transitory computer-readable media of claim 1, wherein the media playback system comprises at least one media playback device, and wherein establishing a metadata exchange channel between a media playback system and the networked microphone system comprises:
    establishing the metadata exchange channel between the at least one media playback device and at least one of (i) the networked microphone device and (ii) the network microphone server.

3. The tangible, non-transitory computer-readable media of claim 1, wherein the media playback system further comprises a media playback server connected to the at least one media playback device, and wherein establishing a metadata exchange channel between a media playback system and the networked microphone system comprises:
    establishing the metadata exchange channel between the media playback server and at least one of (i) the network microphone device and (ii) the network microphone server.

4. The tangible, non-transitory computer-readable media of claim 1, wherein obtaining from the media playback system via the metadata exchange channel, metadata associated with the media playback system comprises transmitting to the media playback system, a request for metadata in response receiving the voice input comprising the context-specific request.

5. The tangible, non-transitory computer-readable media of claim 1, wherein obtaining from the media playback system via the metadata exchange channel, metadata associated with the media playback system comprises periodically obtaining from the media playback system via the metadata exchange channel, metadata associated with the media playback system.

6. The tangible, non-transitory computer-readable media of claim 1, wherein the metadata comprises at least one of (i) one or more configuration parameters of the media playback system, (ii) information about audio content currently playing via the media playback system, (iii) historical information about audio content played by the media playback system, (iv) user preference information relating to audio content, and (v) user preference information relating to media playback system configuration.

7. The tangible, non-transitory computer-readable media of claim 1, wherein the network microphone device is a mobile computing device.

8. A network microphone device of a networked microphone system, the network microphone device comprising:
    one or more processors; and
    tangible, non-transitory computer-readable media having instructions encoded thereon, wherein the instructions, when executed by the one or more processors, cause the network microphone device to perform a method comprising:
        establishing a metadata exchange channel between a media playback system and the networked microphone system, wherein the network microphone device and the media playback system are on a local area network;
        obtaining from the media playback system via the metadata exchange channel, metadata associated with the media playback system;
        receiving a voice input comprising a context-specific request corresponding to media played back by the media playback system; and in response to receiving the voice input, transmitting to a network microphone server of the networked microphone system, a request based on (i) the voice input and (ii) the metadata associated with the media playback system.

9. The network microphone device of claim 8, wherein the media playback system comprises at least one media playback device, and wherein establishing a metadata exchange channel between the media playback system and the networked microphone system comprises:

establishing the metadata exchange channel between the at least one media playback device, and at least one of (i) the network microphone device and (ii) the network microphone server.

10. The network microphone device of claim 8, wherein the media playback system further comprises a media playback server connected to at least one media playback device, and wherein establishing a metadata exchange channel between the media playback system and the networked microphone system comprises:

establishing the metadata exchange channel between the media playback server and at least one of (i) the network microphone device and (ii) the network microphone server.

11. The network microphone device of claim 8, wherein obtaining from the media playback system via the metadata exchange channel, metadata associated with the media playback system comprises transmitting to the media playback system, a request for metadata in response to receiving the voice input comprising the context-specific request.

12. The network microphone device of claim 8, wherein obtaining from the media playback system via the metadata exchange channel, metadata associated with the media playback system comprises periodically obtaining from the media playback system via the metadata exchange channel, metadata associated with the media playback system.

13. The network microphone device of claim 8, wherein the metadata comprises at least one of (i) one or more configuration parameters of the media playback system, (ii) information about audio content currently playing via the media playback system, (iii) historical information about audio content played by the media playback system, (iv) user preference information relating to audio content, and (v) user preference information relating to media playback system configuration.

14. The network microphone device of claim 8, wherein the network microphone device is a mobile computing device.

15. A method comprising:

establishing, by a network microphone device of a networked microphone system, a metadata exchange channel between a media playback system and the networked microphone system, wherein the network microphone device and the media playback system are on a local area network;

obtaining by the network microphone device from the media playback system via the metadata exchange channel, metadata associated with the media playback system;

receiving by the network microphone device, a voice input comprising a context-specific request corresponding to media played back by the media playback system; and in response to receiving the voice input, transmitting by the network microphone device to a network microphone server of the networked microphone system, a request based on (i) the voice input and (ii) the metadata associated with the media playback system.

16. The method of claim 15, wherein the media playback system comprises at least one media playback device, and wherein establishing a metadata exchange channel between the media playback system and the networked microphone system comprises:

establishing by the network microphone device, the metadata exchange channel between the at least one media playback device, and at least one of (i) the network microphone device and (ii) the network microphone server.

17. The method of claim 15, wherein the media playback system further comprises a media playback server connected to at least one media playback device, and wherein establishing a metadata exchange channel between the media playback system and the networked microphone system comprises:

establishing by the network microphone device, the metadata exchange channel between the media playback server and at least one of (i) the network microphone device and (ii) the network microphone server.

18. The method of claim 15, wherein obtaining from the media playback system via the metadata exchange channel, metadata associated with the media playback system comprises transmitting by the network microphone device to the media playback system, a request for metadata in response to receiving the voice input comprising the context-specific request.

19. The method of claim 15, wherein obtaining from the media playback system via the metadata exchange channel, metadata associated with the media playback system comprises periodically obtaining, by the network microphone device from the media playback system via the metadata exchange channel, metadata associated with the media playback system.

20. The method of claim 15, wherein the metadata comprises at least one of (i) one or more configuration parameters of the media playback system, (ii) information about audio content currently playing via the media playback system, (iii) historical information about audio content played by the media playback system, (iv) user preference information relating to audio content, and (v) user preference information relating to media playback system configuration.

* * * * *